US007991422B2

(12) United States Patent
Oroskar et al.

(10) Patent No.: US 7,991,422 B2
(45) Date of Patent: Aug. 2, 2011

(54) DYNAMICALLY ADJUSTING A POWER LEVEL UTILIZING REVERSE ACTIVITY BITS EFFICIENTLY

(75) Inventors: Siddharth Oroskar, Overland Park, KS (US); Sachin R. Vargantwar, Overland Park, KS (US); Manoj Shetty, Overland Park, KS (US); Deveshkumar N. Rai, Overland Park, KS (US); Debasish Sarkar, Irvine, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 303 days.

(21) Appl. No.: 12/351,615

(22) Filed: Jan. 9, 2009

(65) Prior Publication Data

US 2010/0178907 A1 Jul. 15, 2010

(51) Int. Cl.
*H04B 7/00* (2006.01)
(52) U.S. Cl. ...................... 455/522; 455/418; 455/452.1; 455/450; 455/452.2; 455/443; 370/342; 370/319; 370/317; 370/318; 370/235; 370/468; 370/331; 370/338; 370/232
(58) Field of Classification Search .................. 455/522, 455/67.11, 418, 452.1, 450, 443, 452.2; 370/342, 370/319, 235, 318, 232, 317, 331, 468, 338
See application file for complete search history.

(56) References Cited

U.S. PATENT DOCUMENTS

| 6,970,437 | B2 * | 11/2005 | Lott et al. | 370/318 |
| 7,069,037 | B2 * | 6/2006 | Lott et al. | 455/522 |
| 7,764,651 | B2 * | 7/2010 | Kwon et al. | 370/331 |
| 7,848,238 | B1 * | 12/2010 | Pawar et al. | 370/235 |
| 2004/0121808 | A1 | 6/2004 | Hen et al. | |
| 2004/0214591 | A1 * | 10/2004 | Lott et al. | 455/522 |
| 2005/0111397 | A1 * | 5/2005 | Attar et al. | 370/319 |
| 2006/0203724 | A1 * | 9/2006 | Ghosh et al. | 370/229 |
| 2007/0192090 | A1 * | 8/2007 | Shahidi | 704/221 |
| 2009/0197632 | A1 * | 8/2009 | Ghosh et al. | 455/522 |

FOREIGN PATENT DOCUMENTS

| EP | 1246384 A2 | 10/2002 |
| WO | 2005088875 A1 | 9/2005 |

OTHER PUBLICATIONS

Radio Link Protocol, Jun. 17, 2008, http://en.wikipedia.org/wiki/Radio_Link_Protocol.
TCP Tuning, Dec. 17, 2008, pp. 1-3, http://en.wikipedia.org/wiki/TCP_Tuning.

(Continued)

*Primary Examiner* — Kwasi Karikari (57) ABSTRACT

Systems and methods for dynamically adjusting a metric that influences power management of an access terminal are provided. Initially, an access node is configured to distribute reverse-activity bits (RAB's) to the access terminal, which conveys data, at a particular rate, to the access node. Adjusting the dynamic metric involves establishing a number of slots allocated for a filtered reverse-activity bit (FRAB) window and a hybrid reverse-activity bit (HRAB) window, wherein each of the slots are allocated to accept a RAB. The RAB's accepted to the slots of the FRAB window and the HRAB window are recursively averaged to derive a FRAB parameter and an HRAB parameter, respectively. The dynamic metric is adjusted by incorporating either the FRAB parameter or an HRAB parameter therein based on whether ramping conditions are satisfied. The rate of data conveyed from the access terminal is controlled based on the adjusted dynamic metric.

18 Claims, 4 Drawing Sheets

OTHER PUBLICATIONS

Transmission Control Protocol, Dec. 29, 2008, pp. 1-17, http://en.wikipedia.org/wiki/Transmission_Control_Protocol.

Acknowledge Character, Oct. 27, 2008, http://en.wikipedia.org/wiki/Acknowledge_Character.

Negative-Acknowledge Character, Dec. 6, 2008, http://en/wikipedia.org/wiki/Negative-acknowledge_character.

International Search Report and Written Opinion, Patent Cooperation Treaty Application No. PCT/US2010/020657, mailed Apr. 23, 2010, 21 pages.

"Cell Level Rate Control and Autonomous Transmission with Rate Ramping", 3GPP TSG-RAN Working Group 1 Release 6 AD-HOC; 20040621-20040624, Jun. 21, 2004, XP008087242.

* cited by examiner

DYNAMICALLY ADJUSTING A POWER LEVEL UTILIZING REVERSE ACTIVITY BITS EFFICIENTLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Increasingly, mobile stations, such as cell phones and personal digital assistants (PDA's), are utilized by the general population to communicate across wireless networks. These mobile stations and wireless networks typically communicate with each other over a radio frequency (RF) air interface that is configured according to a wireless communication protocol, such as Code Division Multiple Access (CDMA), and conformed according to one or more industry specifications such as IS-95 and IS-2000. Wireless networks that operate according to these specifications are often referred to as provide communication services such as voice, short message service (SMS) messaging, and packet-data communication.

Within the wireless industry, service providers have employed a variety of tools to aid in management of the communications between the wireless networks and the mobile stations. For instance, one of these tools involves a transmission technology for delivering voice communication as voice over Internet protocol (VoIP). VoIP is considered to be a relatively latency-sensitive type of packet-data communication. That is, it is important within the context of VoIP communications that data packets carrying bearer content (e.g., voice communications) traverse from a source (e.g., mobile stations) to a destination (e.g., base transceiver station (BTS)) quickly, consistently, and reliably. That is, voice communications supported by the VoIP transmission technology are susceptible to failure when the communications between the wireless networks and the mobile stations experience relatively little delay, jitter, or packet loss. As a result, in the instance that the BTS is experiencing fluctuations in a load imposed by the mobile stations in communication therewith, a disconnection of the voice communications, or any other type of communication being utilized, may result if the wireless network cannot adapt to manage these load fluctuations; thus, creating end user dissatisfaction.

As such, employing a novel technique for dynamically controlling a rate that the data packets are broadcast by the mobile stations such that the rate is tightly associated with the load fluctuations of the BTS, would enhance an end user's experience when interacting within a wireless network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Some embodiments provide computer-readable media for, among other things, dynamically adjusting, or tuning, a metric that influences the management of operations of an access terminal (e.g., mobile device, cell phone, personal digital assistant (PDA), computing device, and the like). Initially, an access node (e.g., base transceiver station (BTS)) is communicatively coupled to the access terminal over a traffic channel, thereby connecting a user of the access terminal to resources interconnected via a wireless network. The traffic channel typically includes a forward link for transmitting signal messages (e.g., reverse-activity bits (RAB's), time constant(s), and the like) from the access node to the access terminal, and a reverse link for conveying data, at a particular rate, from the access terminal to the access node for distribution across the wireless network. Typically, the data rate is one of the operations influenced by the dynamic metric.

Adjusting the dynamic metric involves implementing an averaging process. The averaging process involves establishing a number of slots allocated for a filtered reverse-activity bit (FRAB) window and a newly proposed hybrid reverse-activity bit (HRAB) window, wherein each of the slots are allocated to accept a RAB that is assigned a value of 0 or 1, based on a level of reverse noise measured within a coverage area of the BTS. In an exemplary embodiment, the number of slots allocated for the HRAB window are substantially less that the slots allocated for the FRAB window. The averaging process continues with recursively averaging the RAB's accepted to the slots of the FRAB window and the HRAB window to derive a FRAB parameter and an HRAB parameter, respectively. Next, the dynamic metric is adjusted by incorporating either the FRAB parameter or an HRAB parameter therein based on whether ramping conditions are satisfied.

In embodiments, the ramping conditions are satisfied upon ascertaining that a percentage of the RAB's accepted into the allocated slots of the HRAB window that have an assigned value of 1 is greater than a threshold percentage, and ascertaining that the RAB's accepted into predefined positions of the most recent portion of the HRAB window have an assigned value of 1. When the ramping conditions are satisfied, the HRAB parameter is incorporated to the dynamic metric; otherwise, the FRAB parameter is combined with the current dynamic metric to generate an updated dynamic metric. The power level of the access terminal is controlled, in part, on the updated dynamic metric, which correspondingly adjusts a rate of data transported from the access terminal to the BTS.

Embodiments generally relate to methods and devices for dynamically managing operations of an access terminal, in communication with the BTS of a wireless network, utilizing reverse-activity information. More particularly, a first aspect of an embodiment includes one or more computer-readable media that have computer-useable instructions embodied on a mobile device for implementing the method of tuning the dynamic metric. Initially, the method involves receiving reverse-activity information from the BTS. Typically, the reverse-activity information provides an indication of a level of reverse noise detected within a coverage area of the BTS. As reverse activity information is received, a dynamic metric is generated utilizing an averaging process.

In exemplary embodiments, the averaging process comprises deriving a long-term indicator of loading of the BTS utilizing the reverse-activity information received within a first window of time, and deriving a short-term indicator of loading of the BTS utilizing the reverse-activity information received within a second window of time. In one instance, the first window encompasses a greater period of time than the second window. The averaging process may continue by implementing the steps of ascertaining whether ramping conditions are satisfied, and, when ramping conditions are satisfied, incorporating the short-term indicator of loading of the BTS into the long-term indicator to calculate the dynamic metric. Accordingly, operations of the access terminal may be dynamically managed the based, in part, on a value of the dynamic metric. In embodiments, reverse-activity information comprises one or more RAB's, the long-term indicator of loading of the BTS comprises a FRAB parameter, and the short-term indicator of loading of the BTS comprises an HRAB parameter.

In a second aspect, embodiments are directed toward a computerized method for controlling a power level of access terminals within a coverage area of the BTS, thereby adjusting a rate of data transported from the access terminals to the BTS over a reverse link. In embodiments, the method includes establishing a connection between each of the access terminals and the BTS via a traffic channel. Generally, the traffic channel comprises a forward link for carrying RAB's from the BTS to the access terminals and the reverse link for carrying data from the access terminals to the BTS at the adjusted data rate. The method may further include the steps of measuring a level of reverse noise within a coverage area of the BTS, assigning the RAB's a value of 0 or 1 based on a level of reverse noise measured within the coverage area of the BTS, and conveying the RAB's to the access terminals for generation of a dynamic metric utilizing an averaging process. In embodiments, the averaging process includes the following procedures: establishing a first window having slots allocated for accepting a predefined sampling of the RAB's that are averaged to derive a FRAB parameter; establishing a second window having slots allocated for accepting a most recent portion of the predefined sampling of the RAB's that are averaged to derive an HRAB parameter; and ascertaining whether ramping conditions are satisfied.

Typically, ramping conditions are satisfied upon ascertaining that a percentage of the RAB's accepted into the allocated slots of the second window having a value of 1 is greater than a threshold percentage and ascertaining that the RAB's accepted into predefined positions of the most recent portion have a value of 1. When the ramping conditions are satisfied, the dynamic metric is generated utilizing the HRAB parameter. When the ramping conditions are not satisfied, the dynamic metric is generated utilizing the FRAB parameter. Accordingly, the data rate of each of the access terminals is based on the dynamic metric; thus, the data received from each of the access terminals is distributed at their new respective adjusted data rate.

A further aspect of an embodiment takes the form of a computer system capable of a computer system capable of controlling a power level of the mobile device by implementing an averaging process to generate a dynamic metric based on RAB's transmitted from the BTS. Initially, the computer system includes the BTS and the mobile device. The BTS is configured to broadcast the RAB's to the mobile device upon assigning the RAB's a value of 0 or 1, based on a level of reverse noise measured within a coverage area of the BTS. The mobile device includes a processing unit coupled to a computer readable medium, where the computer readable medium has stored thereon a plurality of computer software components executable by the processing unit. These computer software components include a FRAB component, an HRAB component, a determining component, a generating component, and an operation-managing component. The FRAB component is configured to manage a first window having slots allocated for accepting a predefined sampling of the RAB's and to average the sampling of the RAB's to derive a FRAB parameter. The HRAB component is configured to manage a first window having slots allocated for accepting a most recent portion of the predefined sampling of the RAB's and to average the sampling of the RAB's to derive a HRAB parameter.

In embodiments, the determining component is configured to ascertain whether ramping conditions are satisfied by ascertaining that a percentage of the RAB's accepted into the allocated slots of the second window that have an assigned value of 1 is greater than a threshold percentage, and by ascertaining that the RAB's accepted into predefined positions of the most recent portion have an assigned value of 1. The generating component is configured to implement the averaging process by incorporating the HRAB parameter with a current dynamic metric to generate an updated dynamic metric, when the ramping conditions are satisfied. Otherwise, the generating component incorporates the FRAB parameter with the current dynamic metric to generate the updated dynamic metric. The operation-managing component is configured to control the power level of a mobile device based, in part, on the updated dynamic metric. In on instance, the controlled power level correspondingly adjusts a rate of data transported from the mobile device to the BTS.

BRIEF DESCRIPTION OF THE SEVERAL
VIEWS OF THE DRAWINGS

Illustrative embodiments of the present invention are described in detail below with reference to the attached drawing figures, which are incorporated by reference herein and wherein.

DETAILED DESCRIPTION

Embodiments provide systems and methods for employing a flexible technique for dynamically adjusting a metric that influences power management of an access terminal are provided. The dynamic metric is adjusted by incorporating either a filtered reverse-activity bit (FRAB) parameter or a hybrid reverse-activity bit (HRAB) parameter to a current dynamic metric based on whether ramping conditions are satisfied. When ramping conditions are satisfied the HRAB parameter is utilized to calculate an updated dynamic metric. Basing the updated dynamic metric in accordance with the HRAB parameter, which is a responsive tool that closely tracks a usage load on a base transceiver station (BTS), is useful to enhance an end user's experience when conveying data within a wireless network. That is, by switching between the use of the FRAB parameter and the HRAB parameter, and using characteristics of the RAB's to satisfy the ramping conditions, the adjusted dynamic metric can closely represent the loading activity of the BTS without expressing sudden spikes or oscillations (resulting from using only the HRAB parameter) or a failure to adapt to accelerated movements in load (resulting from using on the FRAB parameter).

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| BTS | Base Transceiver Station |
| CDMA | Code Division Multiple Access |
| EVDO | Evolution-Data Only |
| FRAB | Filtered Reverse Activity Bit |
| HRAB | Hybrid Reverse Activity Bit |
| LANs | Local Area Networks |
| PDA | Personal Digital Assistant |
| PSMM | Pilot Strength Measurement Message |
| QRAB | Quick Reverse Activity Bit |
| RAB | Reverse Activity Bit |
| RTD | Round-trip Delay |
| WANs | Wide Area Networks |

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Methods and systems are provided for triggering an access terminal (e.g., mobile device) to alter a rate of data being sent therefrom to an access node (e.g., BTS) for distribution to a wireless network. Initially, the mobile device may initiate connectivity to the access node, when powered on in a coverage area of an access node, by sending a request to the access node. The access node may respond by granting the request to the access terminal in a response message, which serves to identify the access terminal to the access node. After acquiring a connection, the access terminal will typically communicate with the access node over the air interface to set up a "session." Essentially, an access terminal that has a session with an access node can engage in packet-data communication over the wireless network to which the access node provides access.

Further, the access node may responsively work to establish an air-interface connection with the access terminal, which involves the access node instructing the access terminal to communicate with the access node over a traffic channel. This traffic channel may take the form of forward link over which the access node sends data the access terminal, and a reverse link over which the access terminal sends data to the access node.

In addition to establishing the connection with the access terminal, and assigning the connection a traffic channel, the access node takes a number of other actions. One of these actions involves validating that the access terminal is authorized to engage in communication via the access node. Another such action is to set up a radio-packet connection between the access node and the packet data serving node (PDSN), which provides access to a packet-data network, for the access terminal. The access node also facilitates establishment of a data link (e.g., a point-to-point protocol (PPP) connection) between the access terminal and the PDSN, and perhaps assignment of an IP address to the access terminal. Once those steps, and perhaps others, are complete, the access terminal has established a session with the access node, and can therefore communicate over the wireless network via the access node. Typically, the air-interface connection is then torn down at the conclusion of a session, thereby freeing up those radio resources for other access terminals. Accordingly, this transition from managing a traffic channel to tearing down the traffic channel implies that the access terminal is switching from active to dormant. In other words, when the session is established, the active access terminal typically is allowed to engage in packet-data communication over the wireless network, using the assigned traffic channel.

Embodiments of the present invention may be clarified with reference to an evolution-data only (EVDO) system using code division multiple access (CDMA). In particular, embodiments of controlling the data rate of each packet of data transmitted in the reverse link in the EVDO mobile communication system will now be discussed. In the EVDO system, the data rate for each data packet transmitted in the reverse direction is controlled based on a power level of the access terminal, which is based on information sent from the BTS. In particular, a BTS generates information determined considering system loading conditions and provides RAB's in accordance with the generated information. That is, the BTS transmits the generated RAB's to mobile stations through a forward link. Typically, the RAB's have a value '1' or '0'. An RAB that is equivalent to 1 indicates that the system, or BTS, is busy, while an RAB that is equivalent to 0 indicates that the system is not busy. Generally, the BTS transmits the RAB's to each access terminal located in its cell, or sector, or coverage area, to provide system loading information thereto. In response, the access terminals control their reverse data rates according to the system loading condition. In one instance, the RAB's are transmitted per specific time, for example, every 1.67 ms, also referred to as a slot.

A description will now be made of an exemplary process in which the access terminal controls its data rate based on the RAB. When the access terminal controls a reverse data rate using the received RAB, it uses various parameters. In embodiments, one of the parameters utilized may be a quick RAB (QRAB), while another may be a filtered RAB (FRAB). In addition, a hybrid RAB (HRAB) may be intermittently utilized to control the reverse data rate, typically, upon satisfying ramping conditions. These parameters are generally determined by the access terminal using the RAB's received from the access node.

Figure 3:
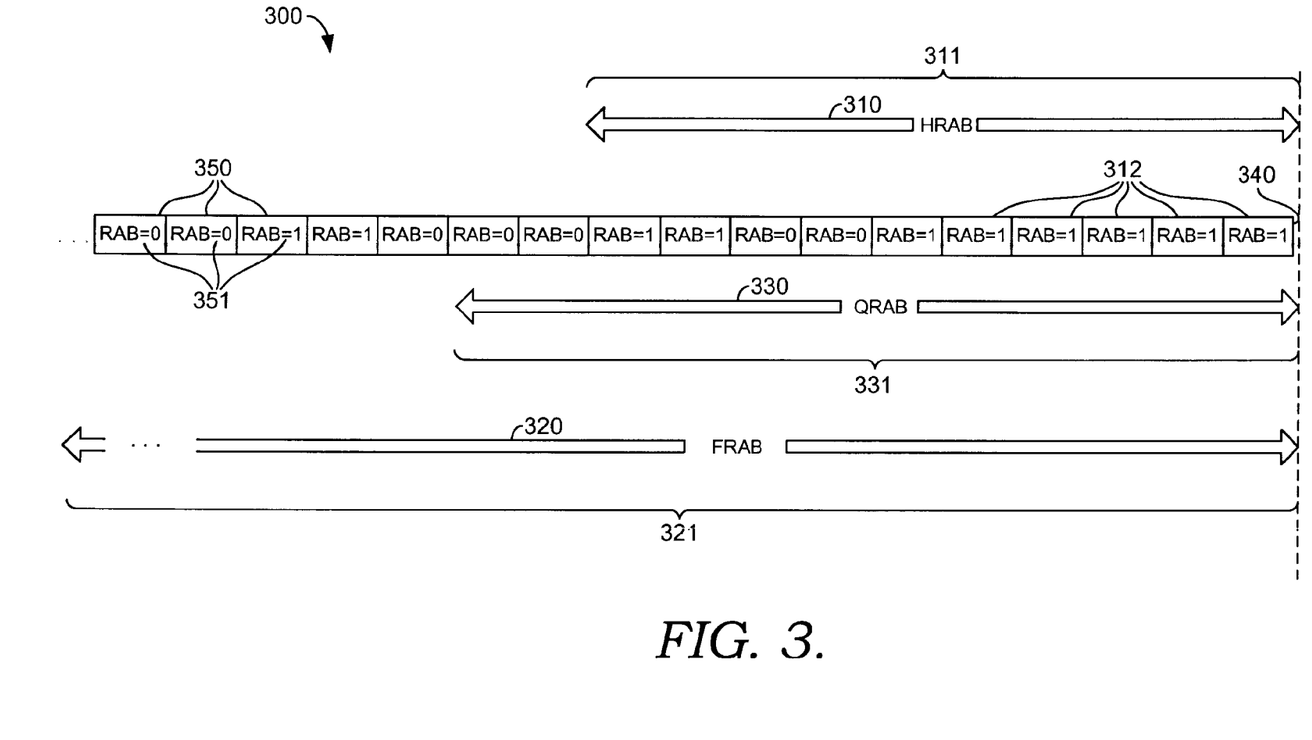
FIG. 3 is a graphical depiction illustrating allocating slots in windows for accepting the RAB's received at the access terminal, in accordance with an embodiment of the present invention.

With reference to FIG. 3, a derivation of the parameters will now be discussed. Generally, FIG. 3 is a graphical depiction illustrating allocating slots 350 in windows for accepting the RAB's 351 received at the access terminal, in accordance with an embodiment of the present invention. Generally, the RAB's 351 are received from the BTS at substantially consistent intervals. Further, in embodiments, the RAB's 351 are assigned a value of 0 or 1 based on the level of reverse noise detected within the coverage area of the BTS. Initially, the BTS provides time constant(s) to the access terminal that defines a number of the slots 350 within a FRAB window 320, an HRAB window 310 and, optionally, a QRAB window 330. As depicted in the exemplary model in FIG. 3, the time constants have instructed the access terminal to allocate slots 311 for the HRAB window 310, slots 331 for the QRAB window 330, and slots 321 for the FRAB window 331. These allocated slots 311, 321, and 331 are configured to accept the current received RAB's 351. Upon acceptance to the appropriate slots 350, the values of the RAB's 311, 321, and 331 are employed to derive the HRAB parameter, the QRAB parameter, and the FRAB parameter, respectively.

In aspects of the invention, the allocated slots 311 of the HRAB window 310 are substantially less in number than the allocated slots 330 of the QRAB window 331. Additionally, the allocated slots 331 of the QRAB window 330 are typically less than the allocated slots 321 of the FRAB window 320. However, each of the windows 310, 320, and 330 encompass a most recent portion of the slots 312 allocated for accepting RAB's 351 that are distributed shortly after the current time 341. These recent slots 312 are utilized for determining whether the ramping conditions are satisfied, as discussed more fully below. Although exemplary configurations of the windows 310, 320, and 330 have been described, it should be understood and appreciated by those of ordinary skill in the art that other types of suitable configurations of allocated slots 350 to process the received RAB's 351 accepted thereto may be used, and that embodiments of the present invention are not limited to the HRAB window 310, the QRAB window 330, and the FRAB window 320 described herein As utilized herein, the HRAB, QRAB, and FRAB parameters are not meant to be limiting, but may encompass a calculated value of any number of RAB's 351 accepted the slots 350 allocated thereto. In one instance, the FRAB parameter indicates a reverse loading condition of a BTS at a specific time. Specifically, the FRAB parameter may indicate a reverse loading condition of the BTS for a long time, which relates to long-term sector loading. In this instance, the calculated value of the FRAB parameter is determined by filtering the RABs 351 accepted to the slots 321 (e.g., 256 slots) of the FRAB window 320 that are continuously received at the access terminal from the BTS. These RAB's may be distributed at a relatively short time interval (e.g., 1.67 ms), or at any other time interval known to those of ordinary skill in the field of telecommunications. Generally, the value of the FRAB parameter is a real number between −1 and +1. In operations, if the FRAB parameter becomes smaller at a specific time, it indicates that the BTS has more frequently transmitted RAB's of a value of 0 indicating the average system loading condition is low. As the FRAB value becomes larger at a specific time, it indicates that the BTS has more frequently transmitted RAB's of a value of 1, and that the average system loading condition is high.

In another instance, the value of the QRAB parameter is determined by performing hard decision on the values of the RAB's 351 accepted to the slots 331 (e.g., 16 slots) of the QRAB window 330. The hard decision may involve generating a value of 1 or 0 from the compiled RAB's 531 in the QRAB window 330. Persons familiar with the field of the invention will realize that calculating the FRAB and QRAB values may be practiced by various techniques which are different from the specific illustrated embodiments above, such as using discontinuous RAB's for the calculations. Therefore it is emphasized that embodiments of the present invention is not limited only to the details of the exemplary calculations above and below, but embrace of a wide variety of calculations (e.g., averaging one or more of the RAB's 351 in the windows) which fall within the spirit of the claims.

Upon calculating the parameters, the access terminal controls its reverse data rate using the QRAB parameter and the FRAB parameter when the ramping conditions are not satisfied. By way of example, the access terminal determines whether to increase or decrease its data rate according to whether the QRAB parameter is −1 or +1. If the QRAB parameter is +1 at a specific time, indicating that the current system loading condition is high, the access terminal may attempt to decrease its data rate. On the contrary, if the QRAB value is −1 at a specific time, indicating that the current system loading condition is low, the access terminal may attempt to increase its data rate. Once the access terminal has determined whether to decrease or increase its data rate according to whether the QRAB value is +1 or −1 at a specific time, the access terminal determines how much it will decrease or increase its data rate according to the FRAB parameter. The FRAB parameter is used because it indicates a reverse system loading condition for a relatively long time, as described above. For example, assuming that a access terminal attempts to increase its data rate determining that the QRAB value is −1 at a particular time, if the FRAB value is very small, the access terminal is allowed to increase its data rate by a relatively high level without increasing a load on the system. On the contrary, if the FRAB parameter is very large even though the QRAB value is still −1, the access terminal increases its data rate by a relatively low level.

Figure 1:
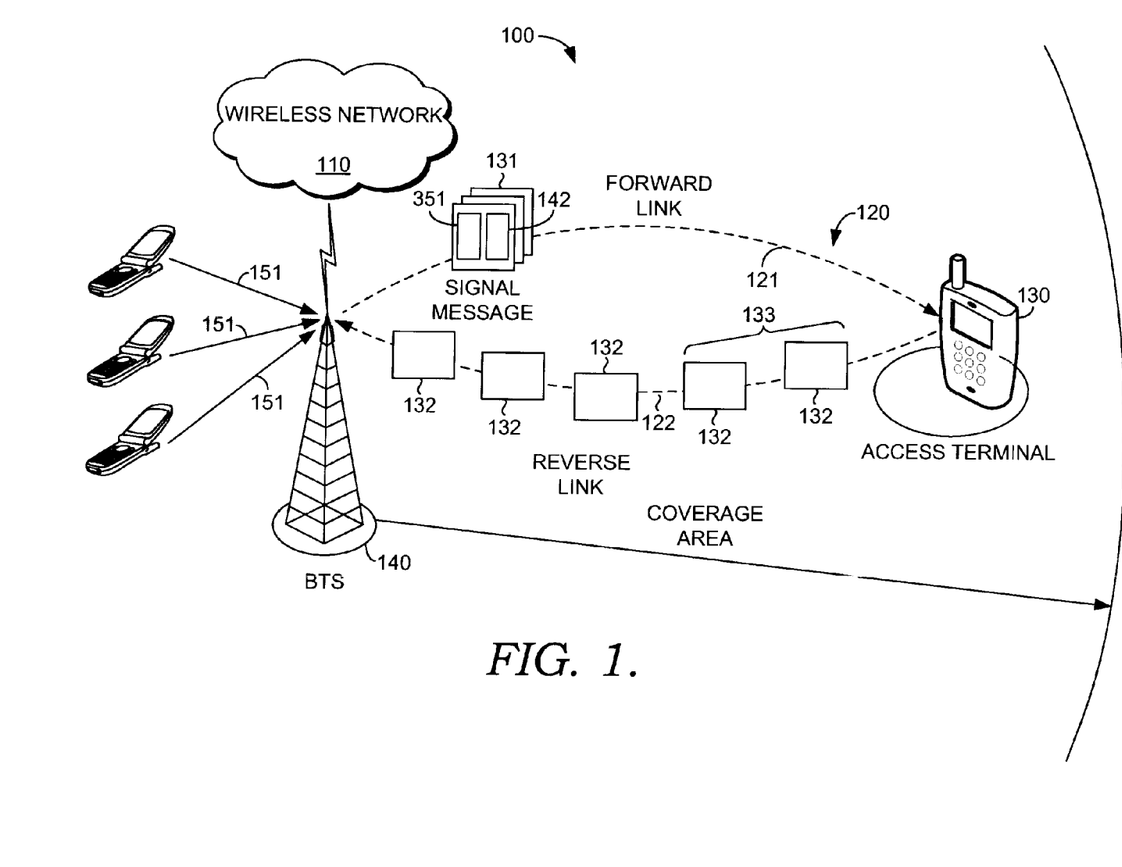
FIG. 1 is a diagrammatic depiction of an exemplary system architecture suitable for use in implementing embodiments of the present invention.

Referring to the drawings in general, and initially to FIG. 1 in particular, a diagrammatic illustration of an exemplary operating environment is shown and designated generally as system 100 configured to provide a user of an access terminal 130 access to a wireless network 110 via a BTS 140. It should be understood that this and other arrangements described herein are set forth only as examples. Other arrangements and elements (e.g., machines, interfaces, functions, orders, and groupings of functions, etc.) can be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory, as discussed above.

With continued reference to FIG. 1, an exemplary system architecture is illustrated that shows the exemplary system 100 configured to initiate a change in a rate 133 of data 132, or data packets, being transmitted from the access terminal 130 to the BTS 140 that are interconnected via a wireless network 110. In addition, the exemplary wireless network environment of the system 100 depicts dispersed RAB's 351 for dynamically adjusting a metric to influence the rate 133 of data 132 conveyed from the access terminal 130, in accordance with an embodiment of the present invention.

Initially, the system 100 includes the access terminal 130, the BTS 140, and the wireless network 110. The access terminal 130 is configured to transmit communications (e.g., the data packets 312) to the wireless network 110 via a reverse link 122 of a wireless connection between the access terminal 133 and the BTS 140. Further the access terminal 130 is configured to move, within the system 100, in and out of coverage areas generated by the source BTS 140. Generally, the access terminal 130 may be any type of device having communications capability. For instance, the access terminal 130 may be, or variously referred to as, a handheld device, mobile device, mobile handset, consumer electronics device, cell phone, personal digital assistant (PDA) unit, laptop computing device, and the like. It should be noted, however, that embodiments of the present invention are not limited to implementation on such mobile devices, but may be implemented on any of a variety of different types of devices within the scope of embodiments of the present invention.

In addition, each mobile device 110 is provisioned with hardware that facilitates the reception of signal messages 131 over a forward link of the 121 of the wireless connection. These signal messages 131 may include communications (e.g., time constants 142, RAB's 351, round-trip delay (RTD) measurements, and the like) that are consistent with a call, data session, etc. The communications may be transmitted at the commencement or ending of establishing a connection, or at any time(s) therebetween. In addition, the hardware is capable of transmitting the data 132 from the access terminal 130 over the reverse link 122 at a particular rate 133.

Figure 2:
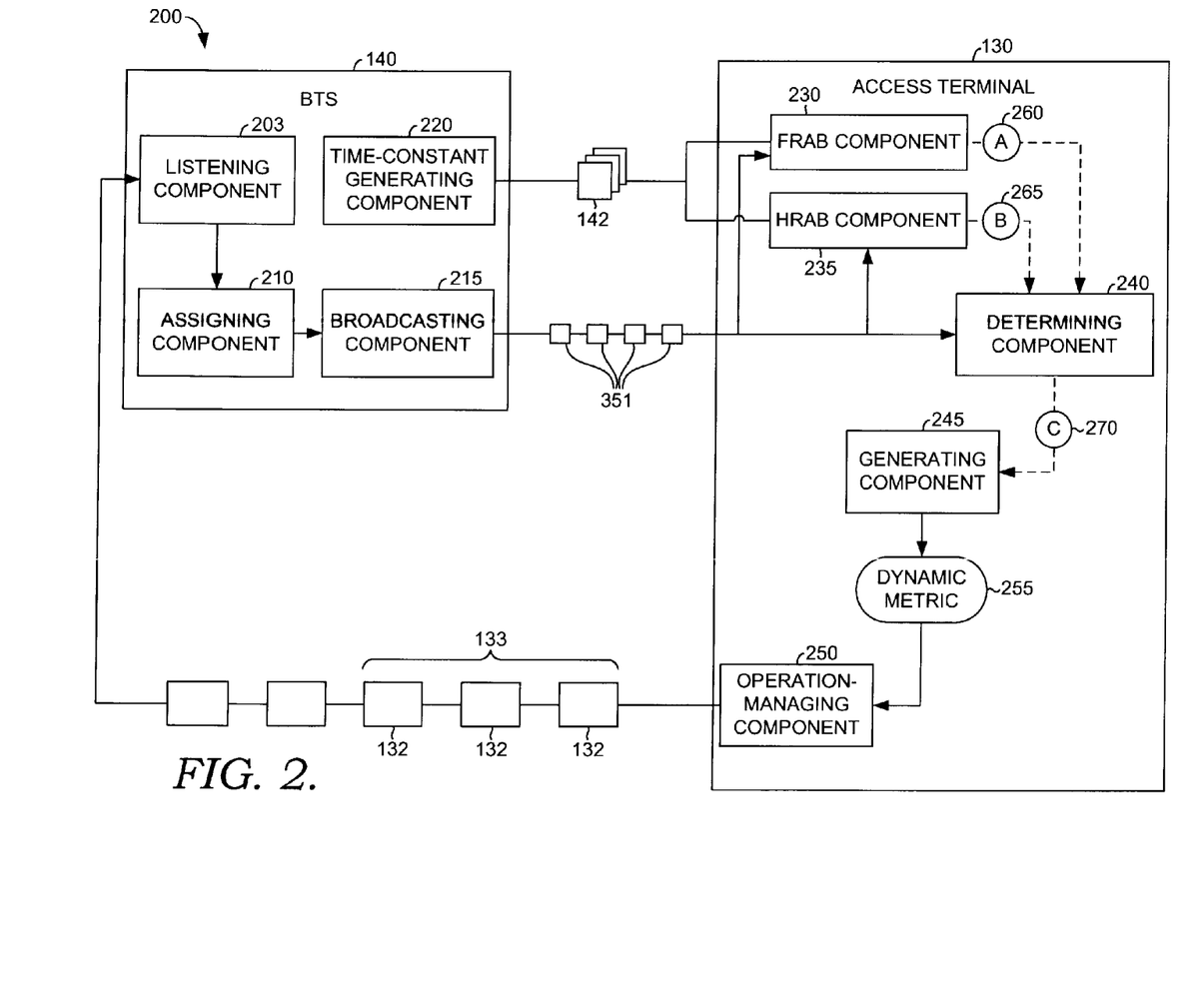
FIG. 2 is a block diagram of an exemplary wireless network environment that depicts dispersed reverse-activity bits (RAB's) for dynamically adjusting a metric to influence a rate of data conveyed from an access terminal, in accordance with an embodiment of the present invention.

Typically, the hardware is configured as, or is linked to, some form of a computing unit (e.g., central processing unit, microprocessor, etc.) to support operations of the component(s) running thereon (e.g., FRAB component 230 and HRAB component 235 of FIG. 2). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the access terminal 130 to enable each device to perform communication-related processes and other operations (e.g., calculate the dynamic metric from the HRAB and/or FRAB parameters, adjust the data rate 133 based on the dynamic metric, and the like). In another instance, the computing unit may encompass a processor coupled to the computer-readable medium accommodated by the access terminal 130 or the BTS 140. Generally, the computer-readable medium stores, at least temporarily, a plurality of computer software components (e.g., components 230, 235, 240, 245, and 250 of FIG. 2) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., saving a tuned time-interval to the computer-readable memory).

Also, beyond processing instructions, the processor may transfer information to and from other resources (not shown) that are integral to, or disposed on, the access terminal 130. Generally, resources refer to software and hardware mechanisms that enable the access terminal 130 to perform a particular function. By way of example only, the resources may include one or more of the following mechanisms: imaging apparatuses (e.g., user-interface display); data stores; printing devices; paging systems; audio alert devices; and media-display units.

The BTS 140, or access node may, in a wireless coverage area (such as a cell or sector), provide service to the access terminal 130 on one or more carrier frequencies. When service is provided on only one carrier, the access terminal 130 will, by default, communicate over a traffic channel on that carrier. When service is provided on more than one carrier, the BTS 140 will select one of those carrier frequencies on which to assign a traffic channel to the access terminal. By way of example, each carrier may occupy a 1.25-MHz-wide band of the RF spectrum. Furthermore, a carrier may actually be a pair of 1.25-MHz-wide bands, in systems that use a frequency-division-duplex (FDD) approach, where the access terminal 130 receives signal messages 131 on one frequency (e.g., forward link 121), and transmits the data 132 on another (e.g., reverse link 122).

Interference can be, and often is, present on a carrier in a sector. In general, on a given carrier frequency in a given sector (e.g., on a given "sector/carrier"), the BTS 140 receives transmissions from the access terminal 130 that is operating on that sector/carrier. However, the BTS 140 often also receives transmissions on that sector/carrier from other access terminals 151, other devices, and/or any other sources of interference on that frequency. At a given moment, the sum total of what an access node is receiving on a given sector/carrier is known as the "reverse noise" on that sector/carrier. In embodiments, at regular intervals, and sometimes quite frequently (e.g., once for every forward-link timeslot (i.e. once every approximately 1.67 ms)), the BTS 140 computes a reverse noise rise (RNR) value, which is the difference between the reverse noise that the BTS 140 is currently detecting and a baseline level of reverse noise. Thus, the BTS 140 computes how far the reverse noise has risen above that baseline. To determine the baseline, EVDO networks typically periodically utilize what is known as a silent interval, which may occur on the order of once every five minutes, and last on the order of 40-100 ms, both of which are typically configurable. During the silent interval, access terminals know not to transmit anything to the access node. The access node can then measure external unexpected interference. As such, the baseline corresponds to the amount of reverse noise when the sector/carrier is unloaded (i.e. without any transmitting access terminals). Note that other reverse-link-noise levels could be used as a baseline, other than the unloaded-sector level. In embodiments, metrics are utilized upon measuring the RNR in a coverage area to dynamically adjust (set or clear) the value of the RAB's 351.

In general, the lower a level of the RNR at a given moment, the more favorable the RF conditions are for communication between access terminal 130 and the BTS 140 at that moment. Correspondingly, the higher the RNR level, the less favorable the RF conditions are. Also, a low RNR generally corresponds to a sector/carrier being lightly loaded. In other words, the BTS 140 is supporting communications for a relatively low number of access terminals 151. A high RNR generally corresponds to a sector/carrier being heavily loaded, where the BTS 140 is supporting communications for a relatively high number of access terminals 151.

As discussed above, the BTS 140 typically utilizes the calculated value of RNR to, among other things, ascertain the value of the RAB's 351, which is a value that the BTS 140 makes equal to 0 or 1, and repeatedly transmits to all the access terminals 151 and 130 operating on a given sector/carrier. Generally, making the RAB's 351 equal to 0 (zero) is known as "clearing" the RAB's 351, while making the RAB's 351 equal to 1 (one) is known as "setting" the RAB's 351. By setting the RAB's 351 when RF conditions are unfavorable (associated with a relatively high RNR), and by clearing the RAB's 351 when RF conditions are favorable (associated with a relatively low RNR) the access terminals 151 and 130 are informed on whether to maintain, decrease, or increase their reverse-link data-transmission rates 133, and consequently their reverse-link transmission power levels. If the RNR level is high, the access terminal 130 will typically reduce its power level, which to some extent corrects the high-RNR situation. When the RAB's 352 are cleared, the access terminal 130 will typically increase its reverse-link data rates 133 and power levels, which does cause RNR to increase. But, this is considered acceptable when RNR is initially low enough and of course it is desirable to grant higher reverse-link data rates 133 to the access terminals 130 when tolerable. As more fully discussed below, the access terminal 130 uses the value of the RAB's 351 to manage operations utilizing a dynamic, iterative, equation-based approach which permits data rates 133 to change more rapidly and track the RNR value more closely than conventional approaches.

In exemplary embodiments, the access terminal 130 transmits data 132 to the BTS 140 on the reverse link 122 at various data rates: 9.6 kilobits per second (kbps), 19.2 kbps, 38.4 kbps, 76.8 kbps, and 153.6 kbps. In embodiments, the reverse link 122 may be a CDMA channel over which the access terminal 130 transmits data 132 to the BTS 140. In embodiments, the access terminal 130 transmits the data 132 at the rate 133 in units of time known as frames, which may be aligned to the length of time of a particular number of slots indicated by the time constant 142 on the forward link 121. Transmission at these various data rates 133 involves using different types of coding for the data to be transmitted, among other differences.

Generally, the access terminal 130 will transmit a first frame to the access node at an initial rate. And then, for the next frame, and for each subsequent frame, the access terminal will transmit at the rate 133 that it is currently using, transition up to the next-higher rate, or transition down to the next-lower rate. These frame-by-frame decisions to maintain or change the reverse-link data rate 133 are controlled by processing the RAB's via the HRAB and FRAB parameters to determine a dynamic metric. In one instance making a frame-by-frame decision, the access terminal 130 checks the RAB's 351. If, for example, the RAB's 351 are cleared, or equal to 0, the RNR level in the sector is low, and thus, the access terminal 130 appreciates it has two options with respect to the rate 133 for the next frame, stay fixed or transition up.

As discussed above, the BTS 140 repeatedly broadcasts the RAB's 351 that have a value equal to 0 or 1. Each individual access terminal 130 then uses that value to compute the QRAB parameter, the HRAB parameter, and the FRAB parameter. Generally, the QRAB parameter is binary (equal to 0 or 1), while the FRAB parameter is a real number having a value anywhere between −1 and +1 inclusive. Further, the QRAB parameter acts as a short-term, binary indication of loading: a QRAB of 1 is associated with congestion on the sector/carrier, while a QRAB of 0 is associated with non-congestion. The FRAB parameter acts as a long-term, continuous, historical value, where values closer to −1 indicate a lower degree of congestion on the sector/carrier reverse link, while values closer to 1 indicate a higher degree of congestion. Thus, both the QRAB and the FRAB reflect the access terminal's interpretation of the RAB from the access node.

The HRAB parameter may is calculated from the RAB's 351 allocated within the HRAB window as discussed above with reference to FIG. 3. While the FRAB window is an item that facilitates a long-term filtering method (e.g., set to a fixed number of slots, typically 128, 256, 384, 512, or allowed ranges of slots within an averaging window), the HRAB window is an item that facilitates a short-term filtering method that includes substantiality less slots than the FRAB window. The HRAB parameter is derived from the values of the RAB's 351 accepted to the slots allocated for the HRAB window, while the FRAB parameter is derived from the values of the RAB's 351 accepted to the slots allocated for the FRAB window. Next, either the HRAB parameter or the FRAB parameter is selected for adjusting a value of a dynamic metric that influences the power level of the access terminal. This selection is based upon a determination of whether ramping conditions are satisfied. The determination involves one or more of the following steps: ascertaining that a percentage of the RAB's 351 accepted into the allocated slots of the HRAB window that have a value of 1 is greater than a threshold percentage (e.g., 70% (configurable) of the total slots of the HRAB window); and ascertaining that the RAB's 351 accepted into predefined positions of the most recent portion of RAB's (e.g., RAB's 351 accepted to the slots 312 of FIG. 3 have a value of 1) have a value of 1. When the ramping conditions are satisfied, the dynamic metric is calculated utilizing the HRAB parameter, and when the ramping conditions are not satisfied, the dynamic metric is generated utilizing the FRAB parameter.

Further, if the ramping conditions are satisfied, this indicates that the sector is getting busy and there is a need to reduce load quickly. Thus, using the HRAB parameter allows a quicker and more accurate response. If the conditions are not met, then use of the FRAB parameter, with greater allocated slots to average, will create a smoothed response, thereby reducing reverse noise rise. Consequently, the data rate 133 of each of the access terminal 130 and 151 may be adjusted based on the dynamic metric. By selecting between the FRAB and the HRAB, the access terminal 130 takes advantage of the better averaging of the longer-focused FRAB parameter with the adaptability and responsiveness to sudden noise changes of the smaller-focused HRAB parameter.

Generally, the dynamic metric is calculated utilizing a continuous averaging process that is performed on streaming values of the RAB's over appropriate windows of samples of the RAB's 351. Accordingly, the dynamic metric is an iterative value that is responsive to the load at the BTS 140. Prior to each reverse-link transmission, the dynamic metric has a current value, and that current value is typically one of the inputs into determining the dynamic metric value in the next calculation. Determining they may use various functions. For instance, if the access terminal 130 sets QRAB parameter to 1 (corresponding to a relatively congested sector/carrier), then dynamic metric will be decremented (e.g., by a particular threshold). On the other hand, if the access terminal 130 sets QRAB parameter to 0 (corresponding to a relatively non-congested sector/carrier), then dynamic metric will be incremented (e.g., by a particular threshold). In an exemplary embodiment, the particular threshold is generated from the FRAB or HRAB parameter based on whether the ramping conditions are satisfied.

Although two different configurations of the dynamic metric computation have been described, it should be understood and appreciated by those of ordinary skill in the art that other types of suitable formulas (e.g., detailed equations) may be used, and that embodiments of the present invention are not limited to those computations described herein.

In practice, the dynamic metric is a governing principle that drives the determination of reverse-link data rates 133 and the relative values of the power level that the access terminal 130 is using to transmit on the reverse link 122 of the traffic channel and/or the power level at which the access terminal 130 is detecting the signal messages 131 from the access node, as is known in the art. Further, this updated dynamic metric value is then used as one of the inputs in the computation which is used to determine a next data packet size/rate 133 for the next reverse-link transmission. In one embodiment, a table is used to correlate the dynamic metric to the data rates 133. In another embodiment, the dynamic metric is compared against a predefined threshold to decide whether to transmit an indication to adjust the power range that the access terminal 130 is allowed to use. In one instance, effective reverse-link data rates 133 can range from 19.2 kbps up to 1.84 megabits per second. Accordingly, the dynamic metric calculation is used as a regulator, to provide data-rate stability over time (utilizing the FRAB parameter) and to permit some instantaneous deviation (utilizing the HRAB parameter).

In operation, when conducting a call or data session with the source BTS, the BTS 140 may send signals or messages (e.g., the signal messages 131) that are received by the access terminal 151 and 150. In this exemplary system 100, time constants 142 are transmitted in the signal messages 131 and are used for generating the QRAB parameter, the HRAB parameter, and the FRAB parameter. For example, if a BTS 140 provides the access terminal 130 with information indicating that the time constant 142 used for generating a FRAB parameter is 256 slots×1.67 ms for the transmission interval, the access terminal 130 generates a FRAB parameter by averaging and filtering RAB's 351 received from the BTS 140 for the FRAB window of 427.52 ms, and uses the generated FRAB parameter in controlling its data rate 133.

In another exemplary system 100, there are several base stations (not shown) neighboring the BTS 140. In this situation, each base station transmits its own RAB's. Therefore, the access terminal 130 in handoff operation receives RAB's from several base stations. In this case, the access terminal 130 generates and manages the QRAB, HRAB, and FRAB parameters separately for each base station. As described above, the FRAB parameter is typically an average value for RAB's received from the BTS 140 for a relatively long time interval, and is information indicating an average system loading condition. Accordingly, the access terminal 130 utilizes the FRAB parameter, indicating long-term reverse system load for controlling a data rate 133, when the ramping conditions are not met. If the ramping conditions are met the access terminal 130 utilizes the HRAB parameter, indicating short-term reverse system load for controlling a data rate 133.

Turning now to FIG. 2, a block diagram of an exemplary wireless network environment that dynamically adjusts a metric to influence a rate of data conveyed from the access terminal 130 is shown, in accordance with an embodiment of the present invention. Initially, the BTS 140 includes a listening component 203, an assigning component 210, a time-constant generating component 220, and a broadcasting component 215 for distributing the RAB's 351 to the access terminal 130. Initially, a connection is established between each of the access terminals 130 and the BTS 140 via a traffic channel. Typically, the traffic channel comprises a forward link for carrying RAB's 351 from the BTS 140 to the access terminals 130 and the reverse link for carrying data 132 from the access terminals 130 to the BTS 140 at the adjusted data rate 133. Upon establishing the connection, the listening component 203 is configured for measuring a level of reverse noise within a coverage area of the BTS 140, where the level of reverse noise is influenced by the data rate 133 of each of the access terminals 130 connected via the traffic channel.

The assigning component 210 is configured for assigning the RAB's 351 a value of 0 or 1 based on the level of reverse noise measured within the coverage area of the BTS 140. The broadcasting component 215 is configured for conveying the RAB's 351 to the access terminals 130 for generation of a dynamic metric 255, typically utilizing an averaging process.

In embodiments, assigning the RAB's a value of 0 or 1 based on the level of reverse noise measured within the coverage area of the BTS includes one or more of the following steps, in no particular order: comparing the measured level of reverse noise to a RNR threshold; setting the value of one of the RAB's to 1 when the level of reverse noise overcomes the RNR threshold; or clearing the value of one of the RAB's to 0 when the level of reverse noise falls below the RNR threshold.

The time-constant generating component 220 is configured for determining time constants 142 to govern the slots allocated within the HRAB, FRAB, and QRAB windows for accepting the predefined sampling of the RAB's 351. Typically, the time constants 142 are configured according to, in part, the measured level of reverse noise at the BTS 140. In embodiments, the time constant 142 are transmitted over the forward link of the traffic channel to the access terminals 130.

As discussed above, the access terminal 130 includes a processing unit coupled to a computer readable-medium, where the computer-readable medium stores a plurality of computer software components executable by the processing unit. The software components may include one or more of the following components: a FRAB component 230, an HRAB component 235, a determining component 240, and a generating component 245. The FRAB component 230 is configured for managing the FRAB window that has slots allocated for accepting a predefined sampling of the RAB's 351. Further, the FRAB component 230 is configured for averaging the sampling of the RAB's 351 to derive the FRAB parameter 260.

The HRAB component 235 is configured to manage the HRAB window that has slots allocated for accepting a most recent portion of the predefined sampling of the RAB's 351. Further, the HRAB component 235 is configured to average the sampling of the RAB's 351 to derive the HRAB parameter 265. The determining component 240 is configured to ascertain whether ramping conditions are satisfied by ascertaining that a percentage of the RAB's 351 accepted into the allocated slots of the HRAB window that have an assigned value of 1 is greater than a threshold percentage, and by ascertaining that the RAB's 351 accepted into predefined positions of the most recent portion have an assigned value of 1. The determining component 240 is then configured to pass on either the HRAB or the FRAB parameter (represented by reference numeral 270) to the generating component 245. The generating component 245 is configured to implement the averaging process by incorporating the HRAB parameter with a current dynamic metric to generate an updated dynamic metric 255, when the ramping conditions are satisfied. Otherwise, the generating component 245 is configured to incorporate the FRAB parameter with the current dynamic metric to generate the updated dynamic metric 255. In embodiments, an operation-managing component 250 is provided to control the power level of a access terminal 130 based, in part, on the updated dynamic metric 255, which correspondingly adjusts a rate 133 of data 132 transported from the access terminal 130 to the BTS 140.

This exemplary system architecture is but one example of a suitable environment that may be implemented to carry out aspects of the present invention, and is not intended to suggest any limitation as to the scope of use or functionality of the invention. Neither should the illustrated exemplary system architecture be interpreted as having any dependency or requirement relating to any one nor combination of the components 203, 210, 215, 220, 230, 235, 240, 245, and 250 as illustrated. In some embodiments, one or more of the components 203, 210, 215, 220, 230, 235, 240, 245, and 250 may be implemented as stand-alone devices. In other embodiments, one or more of the components (e.g., the broadcasting component 215) may be integrated directly into the wireless network 110 of FIG. 1. It will be understood by those of ordinary skill in the art that the components 203, 210, 215, 220, 230, 235, 240, 245, and 250 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one access terminal 130 and one BTS 140 is shown, many more may be communicatively coupled to the wireless network 110 of FIG. 1).

Further, the components of the exemplary system architecture may be interconnected by any method known in the relevant field. For instance, the access terminal 130 and the wireless network 110 of FIG. 1 may be operably coupled via a distributed communications environment that includes multiple BTSs 140 coupled with one another via one or more networks. In embodiments, the wireless network 140 may include, without limitation, one or more local area networks (LANs) and/or wide area networks (WANs). Such networking environments are commonplace in offices, enterprise-wide computer networks, intranets, and the Internet. In addition, many more components (e.g., BTSs, devices, and the like) may be operably coupled to wireless network 140.

In yet other embodiments, the wireless network 110 of FIG. 1 may couple components 203, 210, 215, 220, 230, 235, 240, 245, and 250, thereby forming a distributed computing environment where tasks are performed by remote-processing devices that are linked through appropriate connections. These connections may be established by wired technologies, wireless technologies, or a combination thereof. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.) that are different from the specific illustrated embodiments. Therefore it is emphasized that embodiments of the connections between components are not limited by the examples described, but embrace a wide variety of methods of communications.

Figure 4:
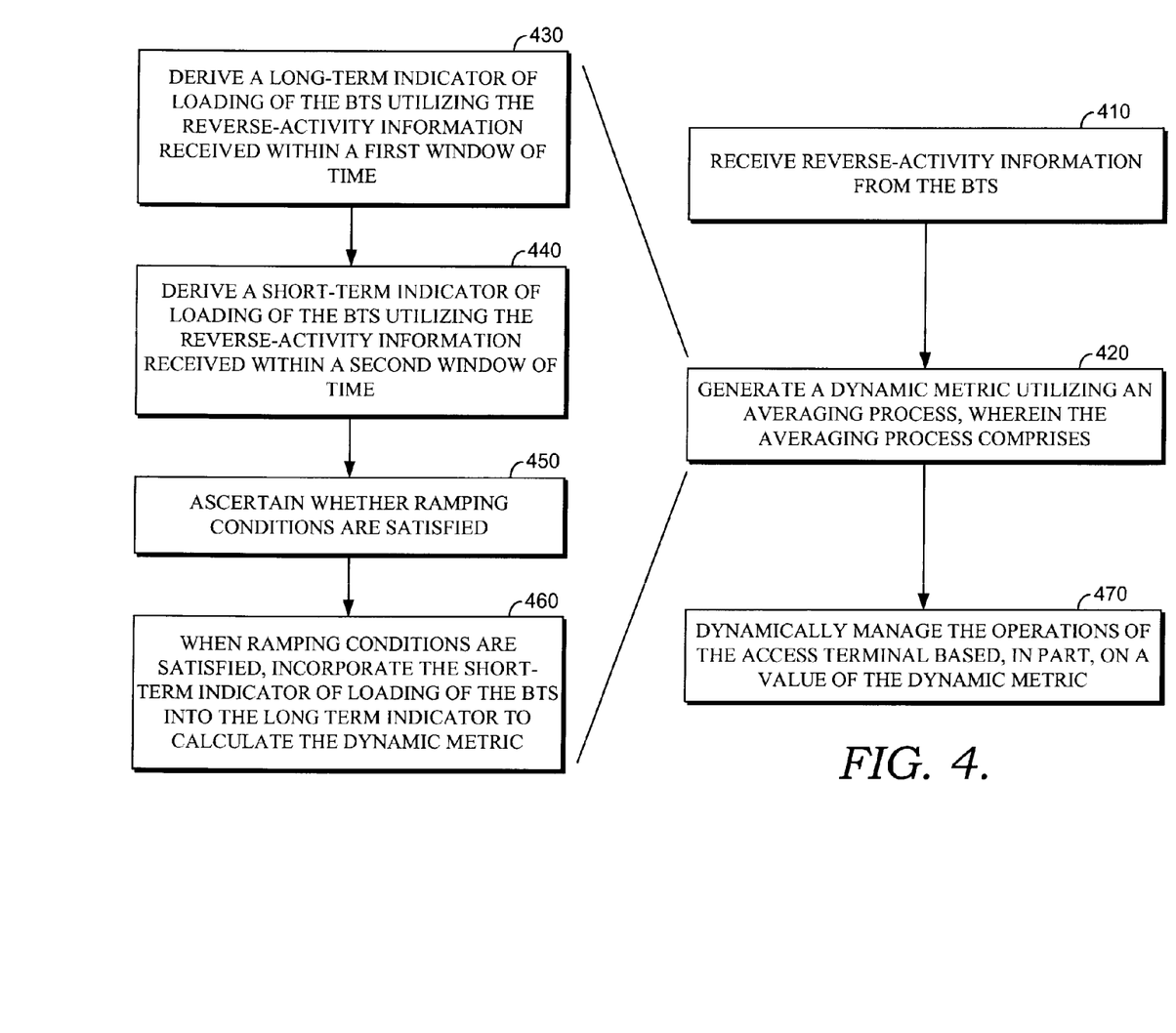
FIG. 4 is a flow diagram showing an overall method for dynamically managing operations of an access terminal, in communication with a base transceiver station (BTS) of a wireless network, utilizing reverse-activity information, in accordance with an embodiment of the present invention.

The operation of the system 100 of FIG. 1 will now be described with reference to FIG. 4. In particular, in FIG. 4, a flow diagram showing an overall method 400 for dynamically managing operations of an access terminal, in communication with a base transceiver station (BTS) of a wireless network is shown (utilizing reverse-activity information), in accordance with an embodiment of the present invention. In operation, the exemplary wireless network environment 200 of FIG. 2 facilitates adjusting a rate of data transmitted over a connection. Initially, the connection is established between the access terminal (e.g., reference numeral 130 of FIG. 1) and the BTS (e.g., reference numeral 140 of FIG. 1). Generally, the connection facilitates communications, such as call and data sessions. Although the terms "step" and "block" are used hereinbelow to connote different elements of methods employed, the terms should not be interpreted as implying any particular order among or between various steps herein disclosed unless and except when the order of individual steps is explicitly described.

Initially, reverse-activity information is received from the BTS, as depicted at block 410. Generally, the reverse-activity information provides an indication of a level of reverse noise detected within a coverage area of the BTS. As indicated a block 420, a dynamic metric is generated utilizing an averaging process. In embodiments, the averaging process involves one or more of the following steps: deriving a long-term indicator of loading (e.g., FRAB parameter) of the BTS utilizing the reverse-activity information received within a first window of time (see block 430); deriving a short-term indicator of loading (e.g., HRAB parameter) of the BTS utilizing the reverse-activity information received within a second window of time (see block 440). Typically, the first window encompasses a greater period of time than the second window.

In embodiments, the averaging process may further includes one or more of the following steps: ascertaining whether ramping conditions are satisfied (see block 450); and when ramping conditions are satisfied, incorporating the short-term indicator of loading of the BTS into the long-term indicator to calculate the dynamic metric (see block 460). As indicated at block 470, the operations of the access terminal are dynamically managed based, in part, on a value of the dynamic metric.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of dynamically managing operations of an access terminal, in communication with a base transceiver station (BTS) of a wireless network, utilizing reverse-activity information, wherein the method comprises:
receiving reverse-activity information from the BTS, wherein the reverse-activity information provides an indication of a level of reverse noise detected within a coverage area of the BTS, and wherein the reverse-activity information comprises one or more reverse-activity bits (RAB's);
generating a dynamic metric utilizing an averaging process, wherein the averaging process comprises:
(a) deriving a long-term indicator of loading of the BTS utilizing the reverse-activity information received within a first window of time, wherein the long-term indicator of loading of the BTS comprises a filtered reverse-activity bit (FRAB) parameter;
(b) deriving a short-term indicator of loading of the BTS utilizing the reverse-activity information received within a second window of time, wherein the first window encompasses a greater period of time than the second window, and wherein the short-term indicator of loading of the BTS comprises a hybrid reverse-activity bit (HRAB) parameter;
(c) ascertaining whether ramping conditions are satisfied;
(d) when ramping conditions are satisfied, incorporating the short-term indicator of loading of the BTS into the long-term indicator to calculate the dynamic metric; and
(e) when ramping conditions are not satisfied, removing the short-term indicator of loading of the BTS from consideration when calculating the dynamic metric and relying on the long-term indicator to calculate the dynamic metric; and
dynamically managing the operations of the access terminal based, in part, on a value of the dynamic metric.

2. The computer-readable media of claim 1, further comprising: recognizing that the access terminal has entered the coverage area of the BTS; and establishing a connection between the access terminal and the BTS via a traffic channel, wherein the traffic channel comprises a forward link for carrying reverse-activity information from the BTS to the access terminal and a reverse link for carrying data from the access terminal to the BTS at the controlled data rate.

3. The computer-readable media of claim 2, wherein dynamically managing the operations of the access terminal comprises adjusting a power level the access terminal utilizes to transmit on the reverse link, thereby controlling a rate of data transported from the access terminal to the BTS.

4. The computer-readable media of claim 3, the method further comprising:
receiving from the BTS one or more RAB's at substantially consistent intervals, wherein the one or more RAB's are assigned a value of 0 or 1 based on the level of reverse noise detected within the coverage area of the BTS; and
receiving a first time constant that defines a number of slots within the first window which are allocated to accept the one or more received RAB's, wherein the one or more RAB's received within the first window are employed to derive the FRAB parameter.

5. The computer-readable media of claim 4, the method further comprising receiving a second time constant that defines a number of slots within the second window which are allocated to accept the one or more RAB's, wherein the one or more RAB's received within the second window are employed to derive the HRAB parameter, wherein the slots that are allocated within the second window correspond to a most recent portion of the slots allocated within the first window.

6. The computer-readable media of claim 5, wherein ascertaining whether ramping conditions are satisfied comprises ascertaining that a percentage of the one or more RAB's accepted into the allocated slots of the second window having an assigned value of 1 is greater than a threshold percentage.

7. The computer-readable media of claim 6, wherein ascertaining whether ramping conditions are satisfied comprises ascertaining that the one or more RAB's accepted into predefined positions of the allocated slots have an assigned value of 1, and wherein the predefined positions include a quantity of the one or more RAB's most recently received.

8. The computer-readable media of claim 7, wherein deriving a long-term indicator of loading of the BTS utilizing the reverse-activity information comprises averaging the one or more RAB's accepted to the allocated slots of the first window to derive the FRAB parameter.

9. The computer-readable media of claim 8, wherein deriving a short-term indicator of loading of the BTS utilizing the reverse-activity information comprises averaging the one or more RAB's accepted to the allocated slots of the second window to derive the HRAB parameter.

10. The computer-readable media of claim 9, wherein incorporating the short-term indicator of loading of the BTS into the long-term indicator comprises:
maintaining the derived FRAB parameter as the dynamic metric;
iteratively updating the dynamic metric at the substantially consistent intervals utilizing the received one or more RAB's; and
when ramping conditions are satisfied, integrating the derived HRAB parameter with the dynamic metric.

11. The computer-readable media of claim 10, wherein dynamically managing the operations of the access terminal based, in part, on a value of the dynamic metric comprises:
comparing the calculated dynamic metric against at least one predefined threshold specified by the BTS;
when the calculated dynamic metric overcomes the at least one predefined threshold, transitioning from a current rate of data transported from the access terminal to the BTS to a decelerated data rate; and
when the calculated dynamic metric fails to overcome the at least one predefined threshold, transitioning from the current data rate to an accelerated data rate.

12. The computer-readable media of claim 11, the method further comprising:
calculating a quick reverse-activity bit (QRAB) parameter utilizing a predetermined scope of the one or more RAB's as inputs to the calculation, wherein the QRAB parameter is a binary value that influences the dynamic metric;
when the binary value of the QRAB parameter is 1, incrementing the calculated dynamic metric; and
when the binary value of the QRAB parameter is 0, decrementing the calculated dynamic metric.

13. The computer-readable media of claim 12, the method further comprising:
receiving from the BTS the one or more RAB's that are predominantly assigned a value of 1, thereby satisfying the ramping conditions; and increasing the dynamic metric by integrating the HRAB parameter thereto, thereby overcoming the at least one predefined threshold.

14. The computer-readable media of claim 12, the method further comprising:
receiving from the BTS the one or more RAB's that are predominantly assigned a value of 0, thereby failing to satisfy the ramping conditions; and
decreasing the dynamic metric by integrating the FRAB parameter thereto, thereby falling below the at least one predefined threshold.

15. A computerized method for controlling a power level of access terminals within a coverage area of a base transceiver station (BTS), thereby adjusting a rate of data transported from the access terminals to the BTS over a reverse link, wherein the method comprises:
establishing a connection between each of the access terminals and the BTS via a traffic channel, wherein the traffic channel comprises a forward link for carrying reverse-activity bits (RAB's) from the BTS to the access terminals and the reverse link for carrying data from the access terminals to the BTS at the adjusted data rate;
measuring a level of reverse noise within a coverage area of the BTS, wherein the level of reverse noise is influenced by the data rate of each of the access terminals connected via the traffic channel;
assigning the RAB's a value of 0 or 1 based on the level of reverse noise measured within the coverage area of the BTS;
conveying the RAB's to the access terminals for generation of a dynamic metric utilizing an averaging process, wherein the averaging process comprises:
(a) establishing a first window having slots allocated for accepting a predefined sampling of the RAB's, wherein the sampling of the RAB's are averaged to derive a filtered reverse-activity bit (FRAB) parameter;
(b) establishing a second window having slots allocated for accepting a most recent portion of the predefined sampling of the RAB's, wherein the most recent portion of the RAB's are averaged to derive a hybrid reverse-activity bit (HRAB) parameter;
(c) ascertaining whether ramping conditions are satisfied by ascertaining that a percentage of the RAB's accepted into the allocated slots of the second window having a value of 1 is greater than a threshold percentage and ascertaining that the RAB's accepted into predefined positions of the most recent portion have a value of 1;
(d) when the ramping conditions are satisfied, generating the dynamic metric utilizing the HRAB parameter;
(e) when the ramping conditions are not satisfied, generating the dynamic metric utilizing the FRAB parameter; and
(f) adjusting the data rate of each of the access terminals based on the dynamic metric; and
receiving data from each of the access terminals at their respective adjusted data rate.

16. The computerized method of claim 15, wherein assigning the RAB's a value of 0 or 1 based on the level of reverse noise measured within the coverage area of the BTS comprises:
comparing the measured level of reverse noise to a reverse noise rise (RNR) threshold;
setting the value of one of the RAB's to 1 when the level of reverse noise overcomes the RNR threshold; and
clearing the value of one of the RAB's to 0 when the level of reverse noise falls below the RNR threshold.

17. The computerized method of claim 16, further comprising:
determining a first time constant to govern the slots allocated within the first window for accepting the predefined sampling of the RAB's;
determining a second time constant to govern the slots allocated within the second window for accepting the most recent portion of the predefined sampling of the RAB's, wherein the first time constant and the second time constant are configured according to, in part, the measured level of reverse noise; and
transmitting the first time constant and the second time constant over the forward link of the traffic channel to the access terminals.

18. A computer system capable of controlling a power level of a mobile device by implementing an averaging process to generate a dynamic metric based on reverse-activity bits (RAB's) transmitted from a base transceiver station (BTS), the computer system comprising:
the BTS that is configured to broadcast the RAB's to the mobile device upon assigning the RAB's a value of 0 or 1 based on a level of reverse noise measured within a coverage area of the BTS;
the mobile device comprising a processing unit coupled to a computer readable-medium, the computer-readable medium having stored thereon a plurality of computer software components executable by the processing unit, the computer software components comprising:
(a) a filtered reverse-activity bit (FRAB) component that is configured to manage a first window having slots allocated for accepting a predefined sampling of the RAB's and to average the sampling of the RAB's to derive a FRAB parameter;
(b) a hybrid reverse-activity bit (HRAB) component that is configured to manage a first window having slots allocated for accepting a most recent portion of the predefined sampling of the RAB's and to average the sampling of the RAB's to derive a HRAB parameter;
(c) a determining component that is configured to ascertain whether ramping conditions are satisfied by ascertaining that a percentage of the RAB's accepted into the allocated slots of the second window having an assigned value of 1 is greater than a threshold percentage, and by ascertaining that the RAB's accepted into predefined positions of the most recent portion have an assigned value of 1;
(d) a generating component that is configured to implement the averaging process by incorporating the HRAB parameter with a current dynamic metric to generate an updated dynamic metric, when the ramping conditions are satisfied, otherwise, incorporating the FRAB parameter with the current dynamic metric to generate the updated dynamic metric; and
(e) an operation-managing component that is configured to control the power level of a mobile device based, in part, on the updated dynamic metric, which correspondingly adjusts a rate of data transported from the mobile device to the BTS.

* * * * *